(12) United States Patent
Petersen et al.

(10) Patent No.: US 9,745,123 B2
(45) Date of Patent: Aug. 29, 2017

(54) SEED CARRIER WITH PIVOTING CONVEYOR

(71) Applicant: UNVERFERTH MANUFACTURING COMPANY, INC., Kalida, OH (US)

(72) Inventors: Brian James Petersen, Ottawa, OH (US); David Richard Smith, Fort Jennings, OH (US)

(73) Assignee: UNVERFERTH MANUFACTURING COMPANY, INC., Kalida, OH (US)

( * ) Notice: Subject to any disclaimer, the term of this patent is extended or adjusted under 35 U.S.C. 154(b) by 305 days.

(21) Appl. No.: 14/606,794

(22) Filed: Jan. 27, 2015

(65) Prior Publication Data
US 2015/0197395 A1  Jul. 16, 2015

Related U.S. Application Data

(63) Continuation of application No. 13/541,553, filed on Jul. 3, 2012, now Pat. No. 8,967,940, which is a (Continued)

(51) Int. Cl.
*B65F 1/00* (2006.01)
*B65D 88/54* (2006.01)
(Continued)

(52) U.S. Cl.
CPC ........... *B65D 88/54* (2013.01); *A01C 15/003* (2013.01); *A01C 15/006* (2013.01); *B60P 1/36* (2013.01);
(Continued)

(58) Field of Classification Search
CPC .................. B60P 1/00; B60P 1/36; B60P 1/42
(Continued)

(56) References Cited

U.S. PATENT DOCUMENTS

| 427,736 A | 5/1890 | Bufkin | 198/317 |
|---|---|---|---|
| 1,905,434 A | 4/1933 | Boyer | 414/328 |

(Continued)

FOREIGN PATENT DOCUMENTS

| CA | 2416677 A1 | 8/2004 |
|---|---|---|
| FR | 2465667 A1 | 3/1981 |

OTHER PUBLICATIONS

Model 2300 Air System and the Model 4800 Air Drill, both made and sold by Concord, as illustrated in the Concord brochure, 12 pages.

(Continued)

*Primary Examiner* — Saul Rodriguez
*Assistant Examiner* — Willie Berry, Jr.
(74) *Attorney, Agent, or Firm* — Rothwell, Figg, Ernst & Manbeck, P.C.

(57) ABSTRACT

A seed carrier includes a main hopper coupled with a frame via leg members. The main hopper has a discharge. A base plate is coupled with the frame. A support arm is rotatably coupled with the base plate at a first end. A belt driven conveyor having a conveyor hopper at a first end and a discharge at a second end is rotatably coupled with a second end of the support arm at an approximate center of gravity thereof. A latch mechanism is provided for detachably coupling the first end of the conveyor with the first end of the support arm such that the conveyor hopper is position below the main hopper discharge. When the conveyor is uncoupled from the first end of the support arm, the conveyor can rotate to a loading position wherein the discharge thereof can be positioned over the main hopper.

21 Claims, 11 Drawing Sheets

Related U.S. Application Data continuation of application No. 12/031,867, filed on Feb. 15, 2008, now Pat. No. 8,221,047.

(60) Provisional application No. 60/901,321, filed on Feb. 15, 2007.

(51) Int. Cl.
| | | |
|---|---|---|
| *A01C 15/00* | (2006.01) | |
| *B60P 1/36* | (2006.01) | |
| *B65G 65/32* | (2006.01) | |
| *B65G 65/40* | (2006.01) | |
| *B65G 65/42* | (2006.01) | |
| *B60P 1/00* | (2006.01) | |

(52) U.S. Cl.
CPC ............. *B65G 65/32* (2013.01); *B65G 65/40* (2013.01); *B65G 65/42* (2013.01); *B60P 1/00* (2013.01)

(58) Field of Classification Search
USPC ............ 414/523; 111/11; 198/312, 315, 316, 198/317, 318
See application file for complete search history.

(56) References Cited

U.S. PATENT DOCUMENTS

| | | | |
|---|---|---|---|
| 3,090,515 A | 5/1963 | Crowther | |
| 3,493,136 A | 2/1970 | Spellman, Jr. | |
| 3,498,483 A | 3/1970 | Meharry | 414/523 |
| 3,968,771 A | 7/1976 | Walgenbach et al. | 118/303 |
| 3,994,512 A | 11/1976 | Parker et al. | 280/687 |
| 3,997,215 A | 12/1976 | Parker et al. | 298/24 |
| 4,037,745 A | 7/1977 | Hengen et al. | |
| 4,218,169 A | 8/1980 | Arends | |
| 4,274,790 A | 6/1981 | Barker | |
| 4,312,621 A | 1/1982 | Quanbeck et al. | |
| 4,411,581 A | 10/1983 | Niewold | |
| 4,419,037 A | 12/1983 | Niewold | |
| 4,491,216 A | 1/1985 | Sawby | |
| 4,503,803 A | 3/1985 | Barnes | 118/303 |
| 4,613,275 A | 9/1986 | Karlowsky | |
| 4,742,938 A | 5/1988 | Niewold | |
| 5,013,208 A | 5/1991 | Grieshop | |
| 5,468,113 A | 11/1995 | Davis | |
| 5,484,249 A | 1/1996 | Klatt | 414/523 |
| 5,516,253 A | 5/1996 | Linscheid et al. | |
| 5,520,495 A | 5/1996 | Sukup | 414/523 |
| 5,529,455 A | 6/1996 | Kaster et al. | |
| 5,538,388 A | 7/1996 | Bergkamp et al. | |
| 5,582,221 A | 12/1996 | Smith et al. | |
| 5,615,990 A | 4/1997 | Grieshop | 414/526 |
| 5,718,556 A | 2/1998 | Forsyth | 414/503 |
| 5,785,481 A | 7/1998 | Ockels | |
| 5,800,116 A | 9/1998 | Smith et al. | 414/523 |
| 5,888,044 A * | 3/1999 | Baskerville | B60P 1/42 198/311 |
| 5,980,189 A | 11/1999 | Rubner | |
| 6,113,339 A | 9/2000 | Adams | |
| 6,120,233 A | 9/2000 | Adam | 414/502 |
| 6,209,880 B1 | 4/2001 | Turnwald et al. | 277/402 |
| 6,325,588 B1 | 12/2001 | Nolin | 414/526 |
| 6,604,620 B2 | 8/2003 | Dennis | 198/312 |
| 6,767,174 B2 | 7/2004 | Cresswell | 414/523 |
| 6,908,380 B2 | 6/2005 | Silver | |
| 7,223,059 B2 | 5/2007 | Smith et al. | |
| 7,267,519 B2 | 9/2007 | Cresswell et al. | |
| 7,393,275 B2 | 7/2008 | Voss et al. | |
| 7,428,956 B2 | 9/2008 | Scherman | 198/312 |
| 7,488,149 B2 | 2/2009 | Waldner | 414/532 |
| 7,500,814 B2 | 3/2009 | Meyer | |
| 7,500,817 B2 * | 3/2009 | Furrer | A01C 15/003 198/311 |
| 7,553,228 B2 | 6/2009 | Dillon | |
| 8,221,047 B2 | 7/2012 | Petersen et al. | 414/523 |
| 2003/0057055 A1 | 3/2003 | Haukaas et al. | 198/313 |
| 2006/0180062 A1 | 8/2006 | Furrer et al. | |
| 2009/0110524 A1 | 4/2009 | Hoffmann | 414/507 |

OTHER PUBLICATIONS

Convey-All, BTS 290 Seed Tender Product Specification, 2 pages.
Convey-All Ind. Inc., Engineering Drawings of BT-1500, 4 pages.
Par-Kan Company, Engineering Drawings, 2 pages.
Great Plains Manufacturing, Inc., Parts Manual—Model ADC2220 Air Drill Cart, May 1, 1997, 61 pages.
Great Plains Manufacturing, Inc., Parts Manual—Model ADC2220 Air Drill Cart, Mar. 1, 2000, 69 pages.
Reexamination File History for Control No. 95000691, 374 pages.
Order Denying Request for Inter Partes Reexamination for Control No. 95000691, Nov. 7, 2012, 15 pages.
Par-Kan Company, Final Invalidity Contentions submitted in *Unverferth Mfg. Co., Inc. v. Par-Kan Co.*, Civil Action No. 13-cv-00097 (N.D. Ind.), Oct. 25, 2013, 130 pages.
Par-Kan Company, Preliminary Invalidity Contentions submitted in *Unverferth Mfg. Co., Inc. v. Par-Kan Co.*, Civil Action No. 13-cv-00097 (N.D. Ind.), Jun. 17, 2013, 169 pages.
Declaration of Shawn Gerdeman with Exhibits A-E dated Sep. 18, 2014, 24 pages.
Hiniker Company, Model 4836 Air Seeder Cart with 4800 Air Drill Front Folding Toolbar, Operator's Manual, Jan. 1999, 58 pages.
Hiniker Company, Models 4831, 4832, and 4833 Air Seeder Cart with 4800 Air Seeder Front Folding Toolbar, Assembly Manual, Jan. 2000, 49 pages.
Hiniker 4831, 4832, 4833 Air Seeder, Jul. 21, 1999, 1 page.
Hiniker Company, Fill Auger Support Assembly, 1 page.
Hiniker Company, 4800 Soybean Planter Marketing Material, 6 pages.
Hiniker Company, Product Photographs, 67 pages.
J&M Manufacturing Company, Inc., Annotated Photographs of Hiniker Company 4836 Air Seed Cart, 8 pages.
Great Plains Manufacturing, 220 Bushel Air Cart, 2 pages.
J&M Manufacturing Company, Inc., J&M Mfg. Co., Inc.'s Amended Initial Invalidity Contentions submitted in *Unverferth Mfg. Co., Inc. v. J&M Mfg. Co., Inc.*, Civil Action No. 3:16-cv-02282-JZ (N.D. Ohio), Feb. 7, 2017, 59 pages.

* cited by examiner

SEED CARRIER WITH PIVOTING CONVEYOR

CROSS-REFERENCE TO RELATED APPLICATIONS

The present application is a Continuation of U.S. application Ser. No. 13/541,553, filed Jul. 3, 2012, which claims priority to U.S. application Ser. No. 12/031,867, filed Feb. 15, 2008, now U.S. Pat. No. 8,221,047, which claims priority to Provisional Patent Application Ser. No. 60/901,321 filed on Feb. 15, 2007, the entire disclosures of which are incorporated herein by reference.

BACKGROUND OF THE INVENTION

Field of the Invention

The present invention relates generally to a conveyor system for a grain or seed carrier. The conveyor system includes a novel pivot system that allows it to either load or unload a container by pivoting it into a loading or unloading position.

Description of the Related Art

Conveyor systems for moving grain, seed, etc. are well known. Auger systems are used to rapidly move grain such as feed or the like, while belt driven conveyors are often used for moving more expensive payload, such as seed.

One belt driven conveyor system includes a generally flat belt constructed from a flexible, sturdy material such as rubber or nylon. The conveyor is housed in a tube with rollers on both ends so that the belt may rotate in order to transmit material from one end to the other. Such conveyors are used for unloading seed carriers or the like. However, current conveyors have several problems.

First, current conveyors have the problem that the material being moved can be damaged by the rollers. Second, current conveyors do not have a full range of motion as implemented in seed carries. Third, current conveyors are only implemented for unloading.

There is a need for new and improved conveyor systems that allow a wagon to be unloaded and loaded using a single mechanism.

SUMMARY OF THE INVENTION

According to an embodiment of the present invention, a seed tender or carrier is provided that includes a main hopper for holding seed and a conveyor for transferring seed to and from the main hopper.

According to an embodiment of the present invention, in an unloading position, one end of the conveyor may be positioned under the discharge of the main hopper and coupled with a pivoting support arm. In the unload position, the conveyor can be used to transfer seed from the main hopper to another location, such as to a planter, seeding unit, or the like. A pivot mechanism allows the conveyor to be rotated from under the box into a loading position in which the conveyor intake can rest on the ground or on a stand while the conveyor discharge is positioned to allow conveyed material to be discharged into the main hopper. In this loading position, the conveyor can be used to fill the main hopper.

According to an embodiment of the present invention, a conveyor hopper is provided on the intake side of the conveyor.

According to an embodiment of the present invention, the pivot mechanism allows the conveyor to swing from side to side to simplify unloading of the main hopper and the filling of planters, etc. The pivot mechanism can include a hydraulic cylinder that adjusts the vertical height of the conveyor discharge relative for different filling applications.

According to an embodiment of the present invention, a pivot single pivot point can be provided at one end of the support arm to allow the conveyor to be rotated between the loading and unloading position. The conveyor may be balanced on the pivot point at a location near or at the center of gravity, thereby permitting the conveyor to be rotated with minimal effort on the part of the operator.

According to an embodiment of the present invention, the conveyor can be rotated through at least 180 degrees about a vertical axis and so that it may be positioned in either a forward or rearward transport position. This feature enables the tender to be pulled by different vehicles such as by a pick-up truck with the conveyor forward or by a grain truck with the conveyor rearward.

Further applications and advantages of various aspects and embodiments of the present invention are discussed below with reference to the drawing figures.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

In embodiments of the present invention, the novel conveyor pivot system can be implemented with seed carrier or seeding machines. The following section describes non-limiting examples of illustrative seeding equipment according to embodiments of the present invention. It should be appreciated that the following examples are provided for illustration and the present invention is not intended to be limited to the embodiments described herein.

Figure 1:
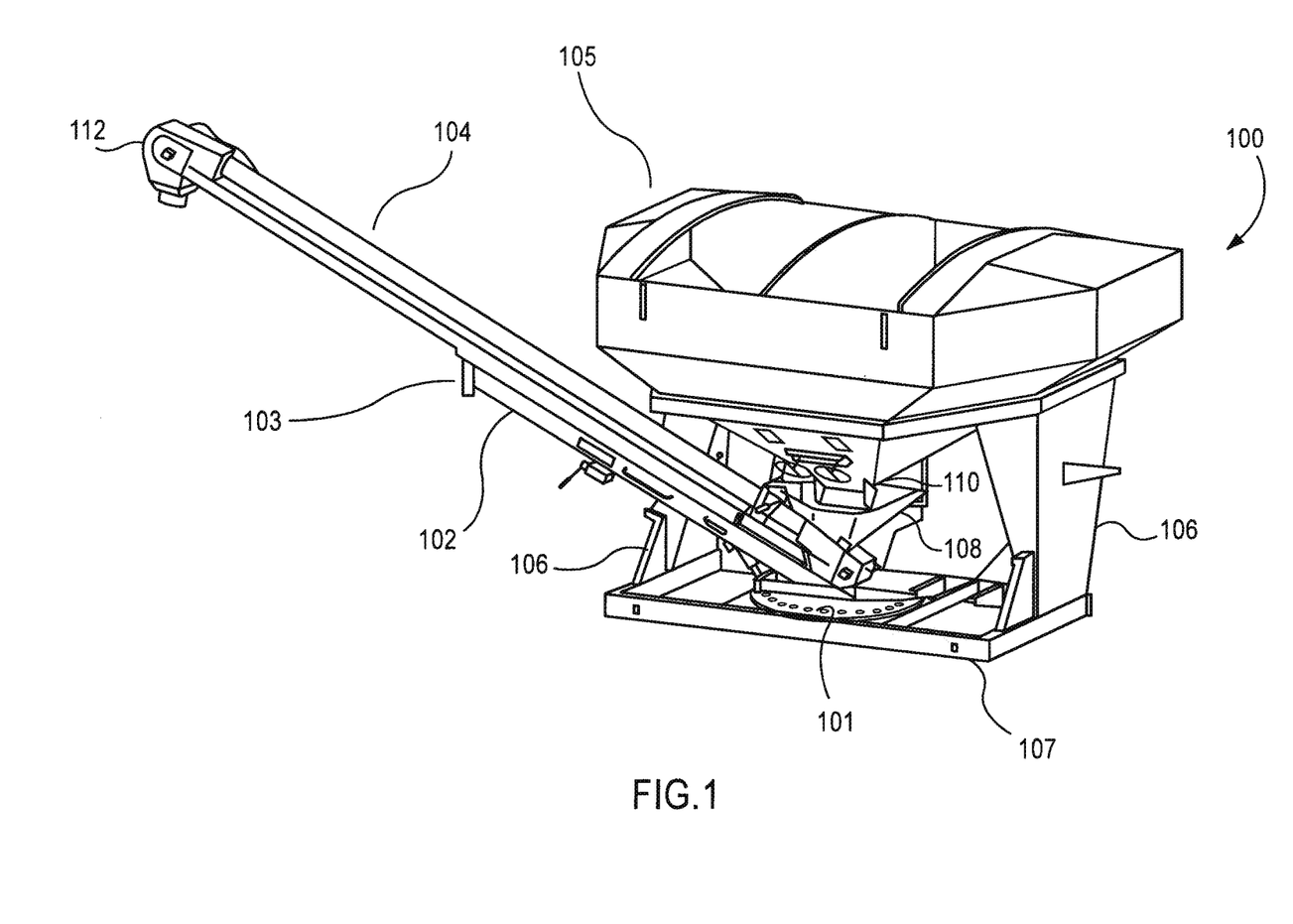
FIG. 1 illustrates a seed carrier according to an embodiment of the present invention.

FIG. 1 is a diagram depicting a seed carrier having a tube conveyor according to an embodiment of the present invention. The seed carrier 100 includes a main hopper 105 coupled to a frame 107 by legs 106. A conveyor 104 is supported by a support arm 102 coupled with a pivoting mechanism 101 fixed to the frame 107. The conveyor 104 is pivotably coupled with the support arm by a coupling 103 at a point that is preferably near or at the center of gravity of the conveyor 104. The conveyor 104 is also coupled to the support arm 102 by a latch (not shown) at the bottom of the conveyor. The latch allows the conveyor 104 to be uncoupled from the support arm 102 at the bottom so that the conveyor is free to rotate about the coupling 103. By positioning the coupling 103 at or near the center of gravity of the conveyor 104, the conveyor 104 balances on the pivoting coupling 103 such that little effort is required to rotate the conveyor 104.

The conveyor 104 includes a conveyor hopper 108 at its base, which is shown in the unloading position below the gravity discharge 110 of the main hopper 105. At the other end of the conveyor 104 is the discharge 112. Seed can be gravity feed from the main hopper 105 into the conveyor hopper 108, which can then be moved to the discharge 112 of the conveyor 104 by an internal elevator (not shown). In one embodiment, the elevator is a motor-driven belt type elevator coupled onto rollers at both ends of the conveyor.

Figure 2:
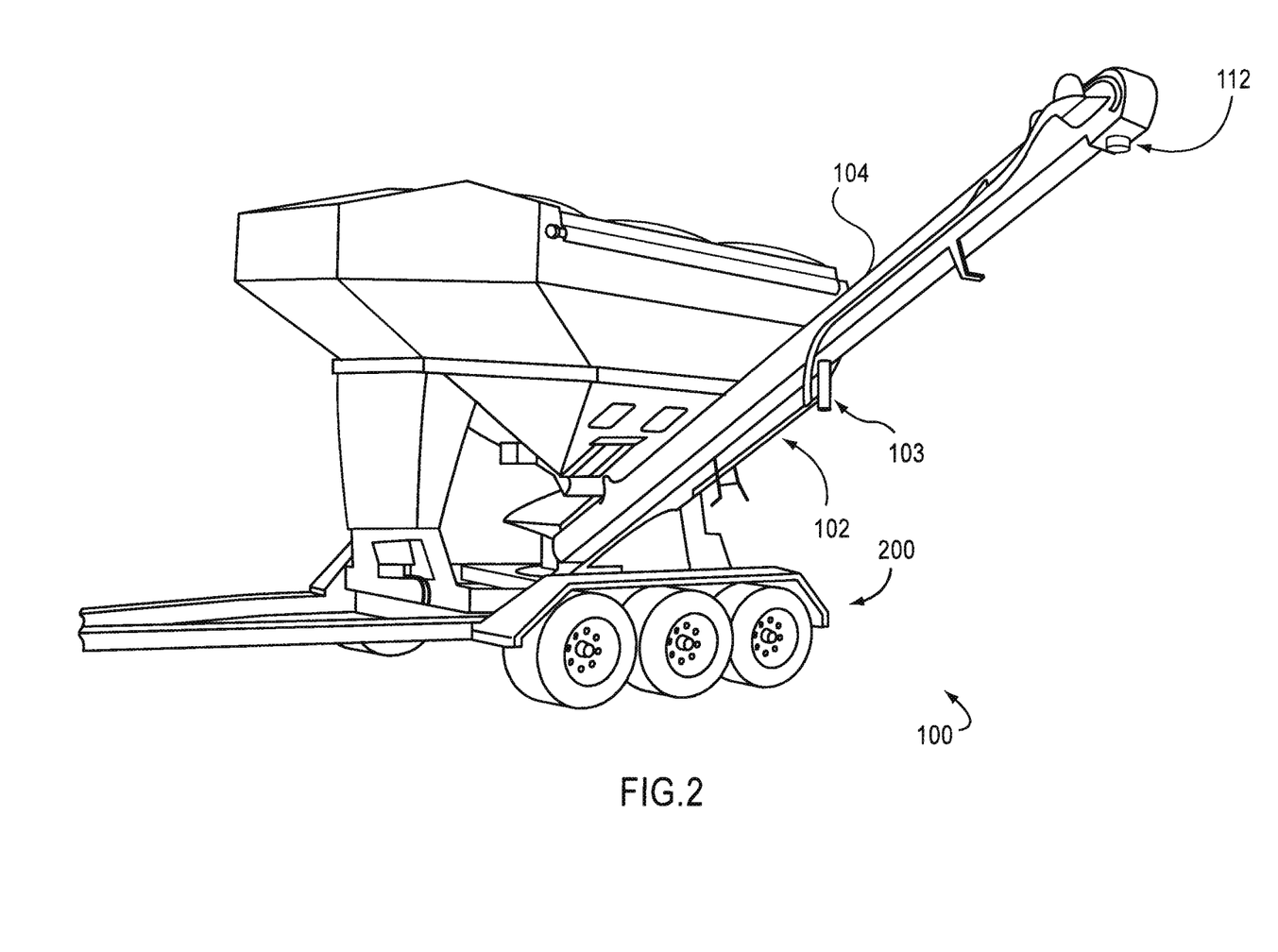
FIG. 2 is a view of a seed carrier in an unloading position according to an embodiment of the present invention.

The seed carrier 100 may be transported by conventional means such as on a trailer. FIG. 2 illustrates the seed carrier 100 on a three axle trailer 200 according to an embodiment of the present invention. As shown, the conveyor 104 is in the unloading position.

Figure 3:
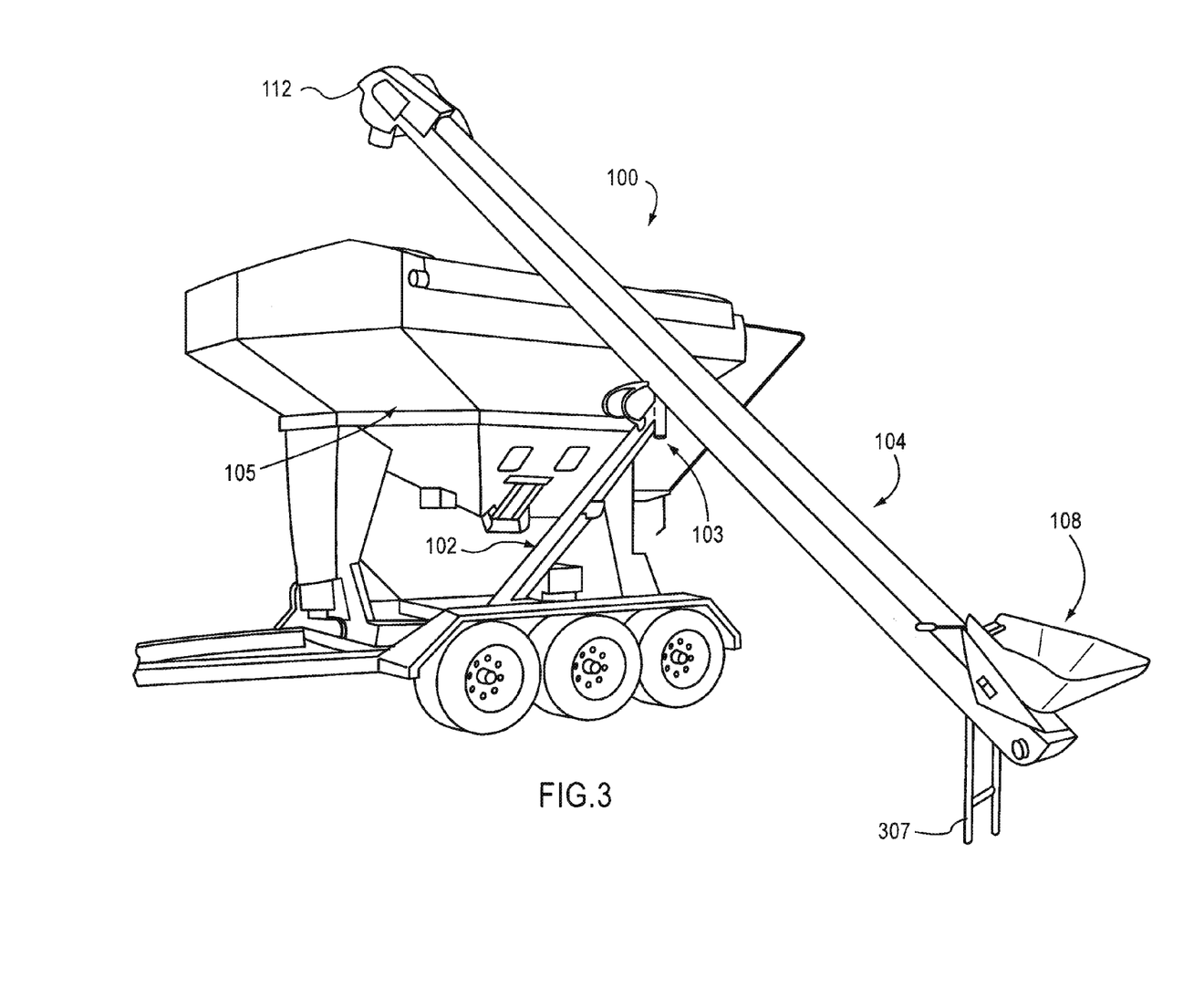
FIG. 3 is a view of a seed carrier in a loading position according to an embodiment of the present invention.

FIG. 3 illustrates the seed carrier 100 in the loading position. As shown, the conveyor 104 is uncoupled from the support arm 102 at its base and rotated 180 degrees about pivot coupling 103 so that the conveyor hopper 108 is positioned at a convenient location away from the carrier while the discharge 112 of the conveyor 104 is located over the main hopper 105. A stand 307 is provided for holding the conveyor hopper 108 in place. The stand 307 may be integrated with the conveyor 104.

Accordingly, in the loading position, grain, seed or like can be feed into the conveyor hopper 108 to be moved to the discharge 112 for filling the main hopper 105.

Figure 4:
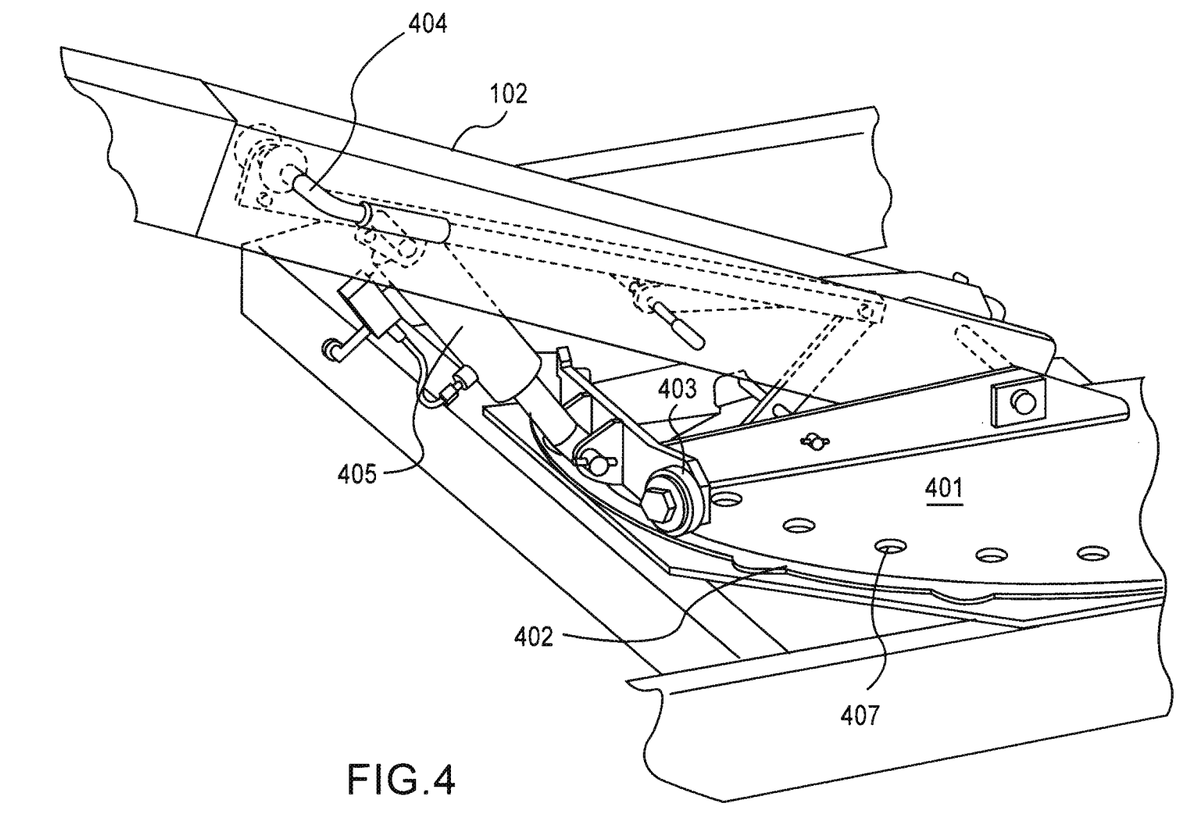
FIG. 4 is a view of a base system for the seed carrier according to an embodiment of the present invention.

FIG. 4 is a view of the pivoting base of the support arm 102. As shown, the support arm 102 can be pivotably coupled to a base 401 at a center point so that the support arm 102 is rotatable about a vertical axis. Wheels 403 provide support and can run along a track 402 to facilitate the support arm's 102 motion about the perimeter of the base 401. The support arm 102 can be locked into a selected position of the base 401 by engaging a pin (not shown) with one of a plurality of the holes 407 distributed around the base 401. The pin is disengaged with a hole by actuating a lever mechanism 404, which lifts the pin out of a hole. The lever mechanism 404 may be spring actuated to bias the pin toward the holes, so that simply releasing the lever will allow the pin to engage with one of the holes 407. Also shown, a hydraulic piston 405 is coupled with the support arm 102 for adjusting the height of the support arm 102.

Figure 5:
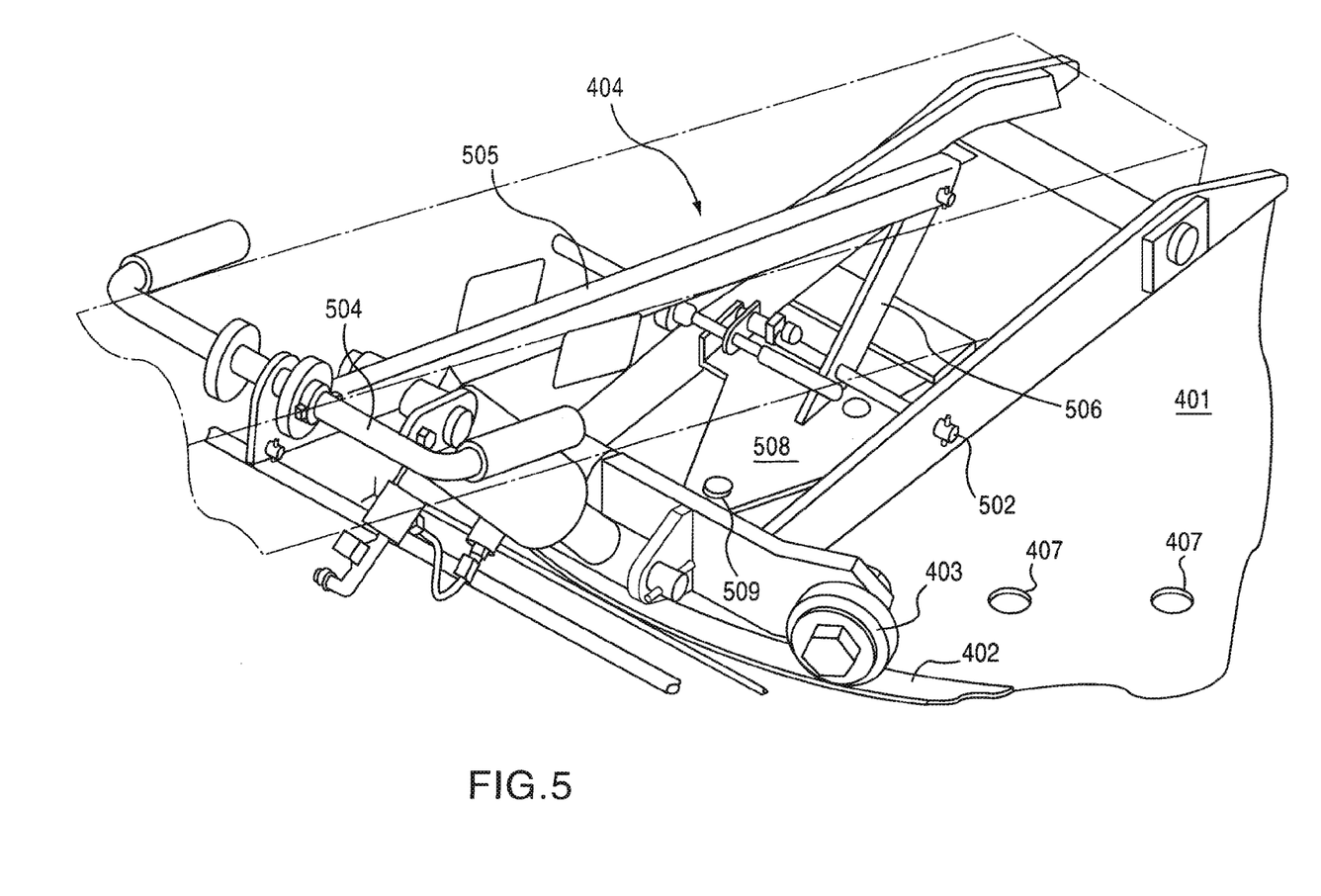
FIG. 5 is a view of a lever mechanism for the base system according to an embodiment of the present invention.

FIG. 5 is an alternative view of the support arm base. As shown, lever mechanism 404 includes a handle 504 coupled with a cross-bars 505 and 506. Cross-bar 506 is coupled to cross-bar 505 on one end and to a plate 508 having a pin 509 on the other end, and with a pivoting coupling 502 at a point near the plate. Rotating the handle 504 applies a downward force to crossbar 506 causing it to rotate about the coupling 502 to raise the plate 508 to disengage the pin 509. While disengaged, the base 401 is free to rotate about its vertical axis. Springs may be provided for biasing the pin 509 toward the holes 407 for engaging therewith, or the pin 509 can be engaged by gravity.

Figure 6:
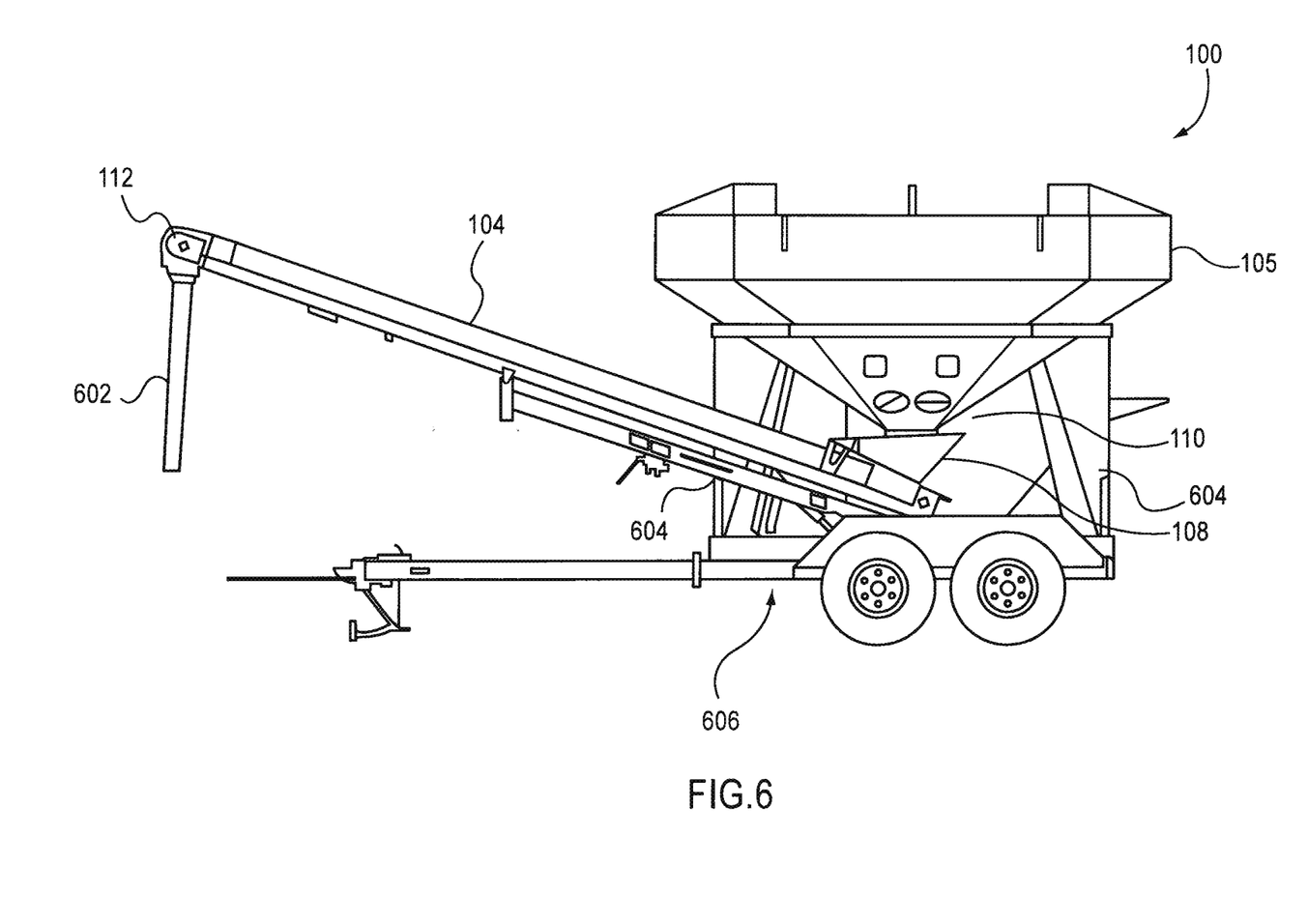
FIG. 6 is a view of a seed carrier in a transport position according to an embodiment of the present invention.

FIG. 6 is a side view of a seed carrier 100 according to an embodiment of the present invention. As shown in FIG. 6, the conveyor 104 includes an elongated discharge spout 602 and is positioned in a transport position. Support members 604 may be mounted on or integral with the legs 106 for holding the conveyor 104 in a forward transport position as shown, or a rearward transport position. As shown, the carrier 100 is fixed to a dual axle trailer 606.

Figure 7:
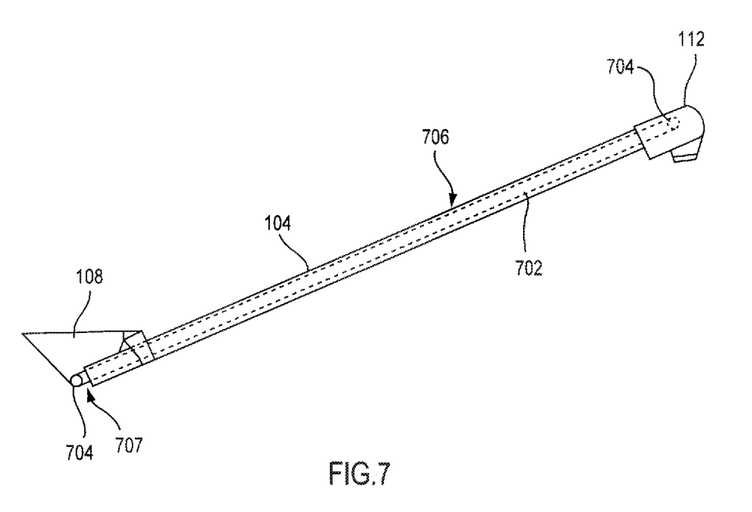
FIG. 7 is a view of a belt conveyor for the seed carrier according to an embodiment of the present invention.

FIG. 7 illustrates a basic belt driven conveyor according to an embodiment of the present invention. The conveyor 104 comprises a belt 702 that winds about a pair of rollers 704. The rollers are positioned outside a tube section 706, a first roller being positioned in the discharge 112 and a second roller being positioned below the conveyor hopper 108. A motor (not shown) or other means for turning the rollers may be provided at either end of the conveyor. A void 707 exists below the rollers 704 to allow the belt 702 to travel on its return path.

Figure 8:
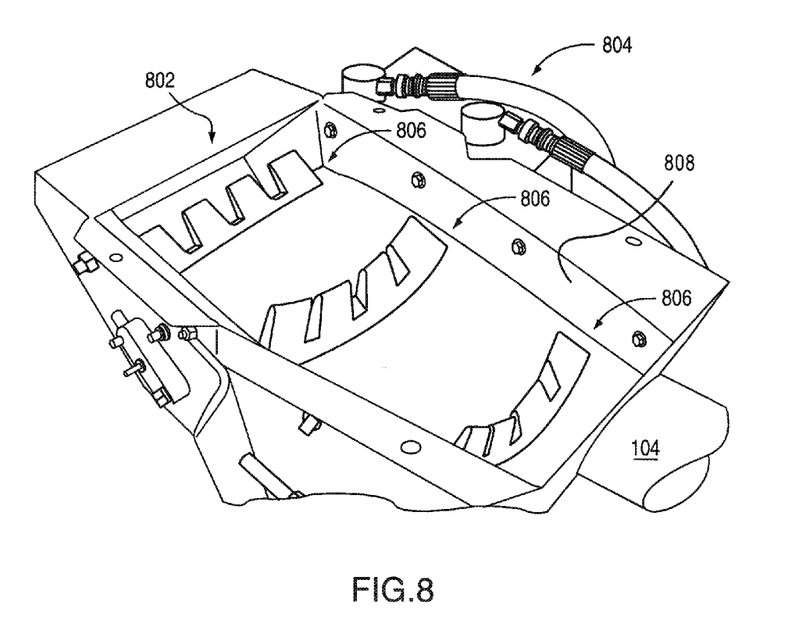
FIG. 8 is a view of the discharge end of a conveyor according to an embodiment of the present invention.

FIG. 8 is a view of a conveyor belt according to an embodiment of the present invention. The discharge end of a conveyor is shown where a conveyor belt wraps around a motor driven roller 802. The motor may be a hydraulic motor and therefore, hydraulic hoses 804 provide hydraulic fluid flow to and from the motor. Teeth 806 are provided to push grain or seed up the conveyor. As shown, the conveyor belt is cupped in the tube section but flattens out as it reaches the roller 802. Channeling members (seals) 808 are provided on each side of the belt to form a seal and prevent grain or seed from falling off the edges of the belt as the belt begins to conform to the tubular portion of the conveyor 104.

Figure 9:
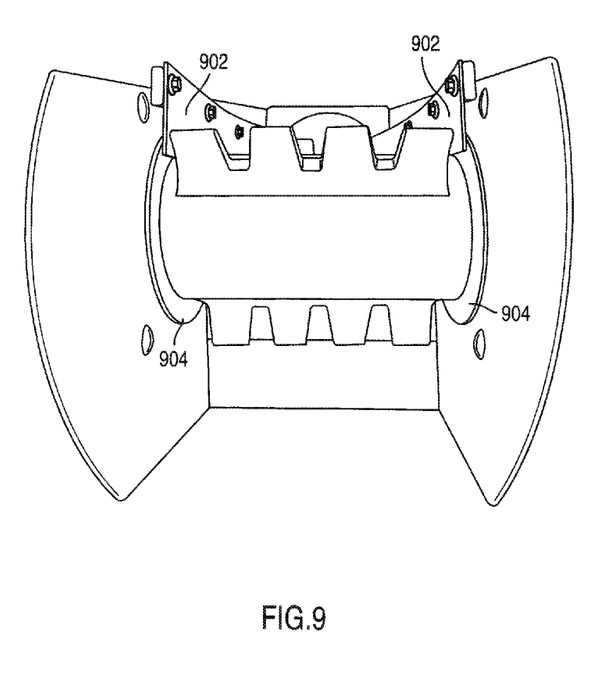
FIG. 9 is a forward view of a conveyor belt wrapping around a roller according to an embodiment of the present invention.

FIG. 9 is a front view of the belt as it travels over the roller 802. Channeling members (seals) 902 are provided on each side of the belt to form a seal and prevent grain or seed from falling off the edges of the belt as the belt flattens at the roller. As shown, the channeling members 902 are fixed to the conveyor discharge 112 with bolts, but can be fixed by other means or can be integral with the discharge.

Discs 904 are provided at the rollers at the edge of the belt to provide additional channeling/sealing means. The discs 904 are preferably integral with the rollers or coupled therewith so that they may rotate.

Figure 10:
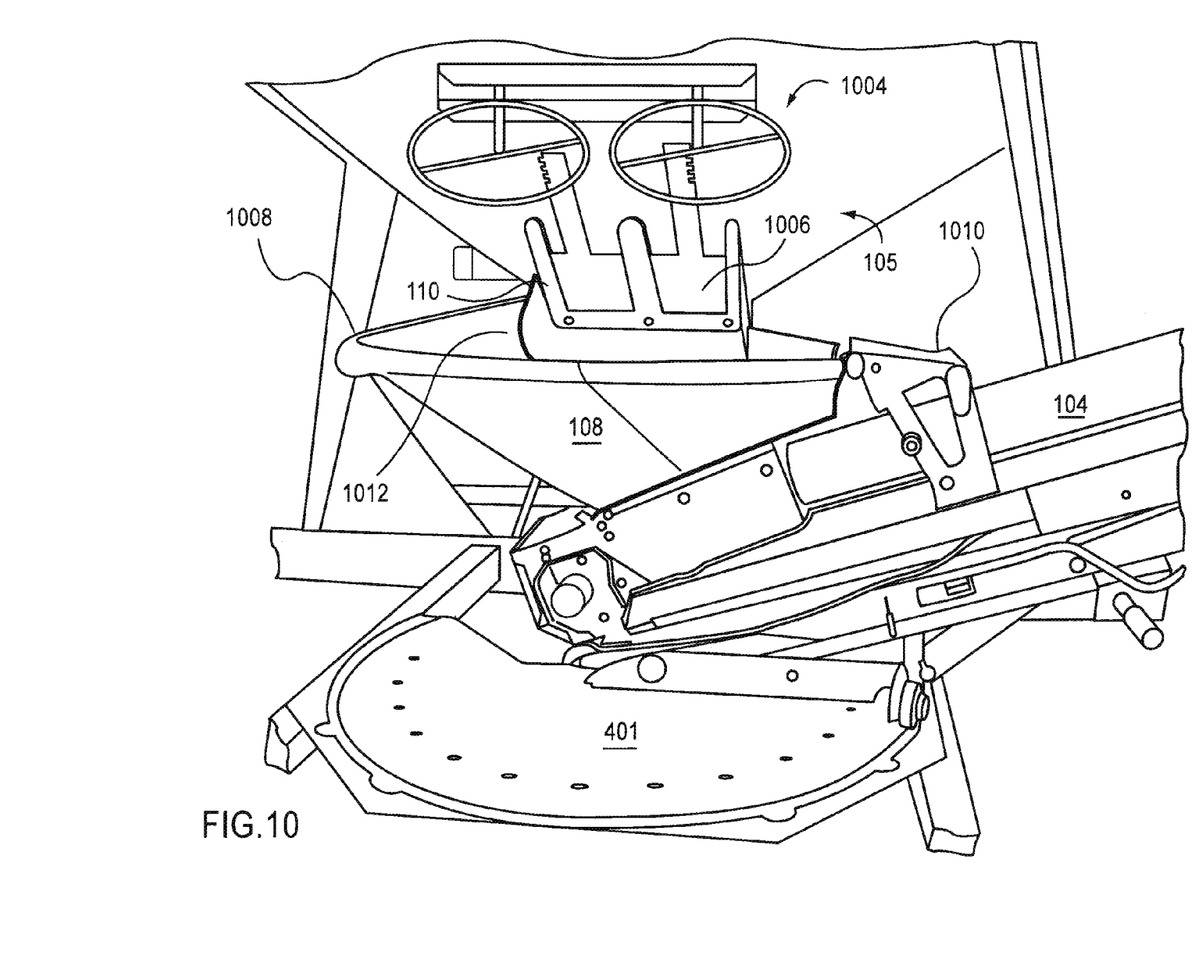
FIG. 10 is a view of the conveyor hopper in an unloading position according to an embodiment of the present invention.

FIG. 10 is a side view of the hopper end of the conveyor 104. As shown, conveyor hopper 108 sits above in ingress to the conveyor 104. When coupled to the support arm 102, as shown, the conveyor hopper 108 is positioned below a discharge of the main hopper 106. The discharge 110 may be opened by conventional means. As showed, a wheel handle mechanism 1004 is provided for opening the discharge doors 1006.

The conveyor hopper 108 is preferably manufactured from light weight materials such as plastic, canvas, rubber or vinyl. As shown, the hopper 108 may include a mechanism for opening and closing the hopper. In this embodiment, flexible coupling or hinge is provided at one end 1008 of the hopper 108 and a mechanism 1010 is provided at the end of the hopper 108 and is coupled with the conveyor 104, such that the hopper 108 may be made to have an appropriate fit with the discharge 110 of the main hopper 105. A flap 1012 can be provided at the bottom of the discharge 110.

Figure 11:
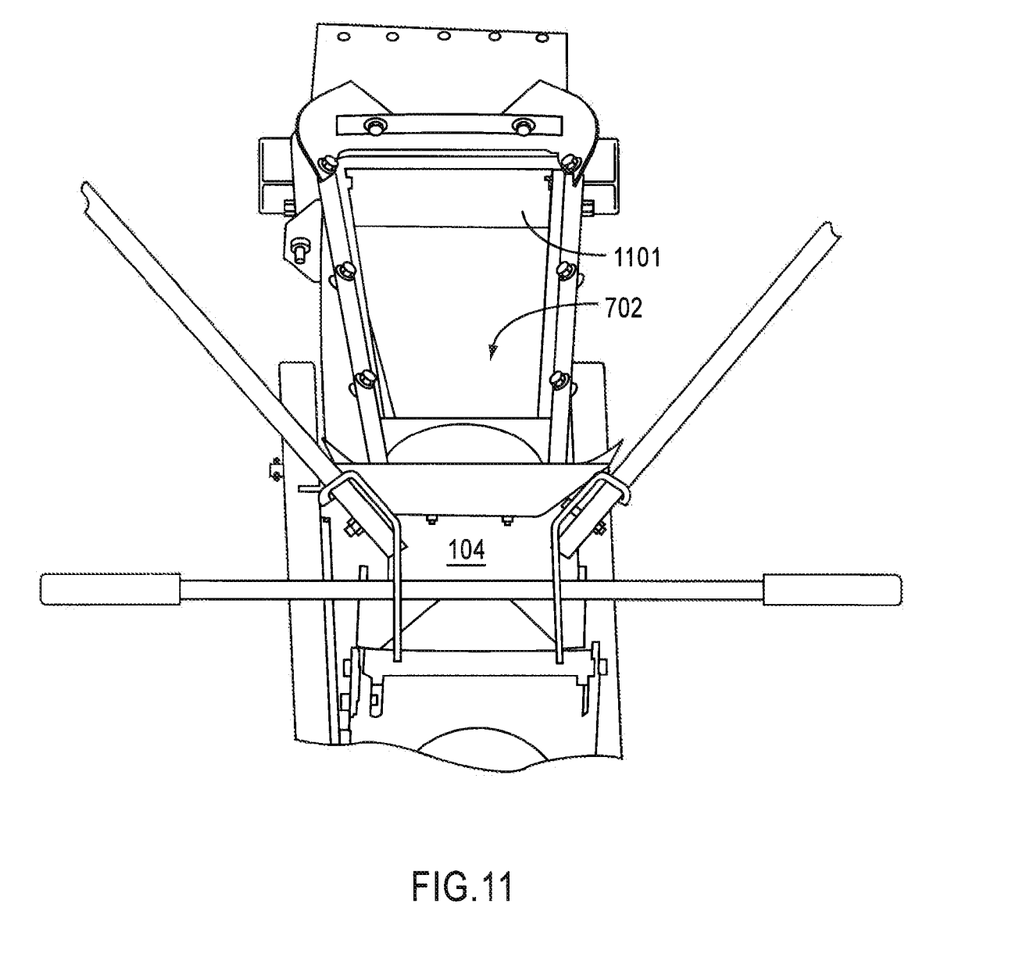
FIG. 11 illustrates the receiving end of the conveyor according to one embodiment of the present invention.

FIG. 11 is a schematic view of the hopper end of the conveyor. As is shown, a brush seal 1101 can be located across the belt 702. The brush seal 1101 retains the conveyed material within the hopper and does not allow the material to enter the void 707 (shown in FIG. 7) under the roller. Such an arrangement is desirable because it prevents the conveyed material from being subjected to mechanical agitation, which would result in damage to the conveyed material. The brush seal 1101 allows the conveyor teeth 806 to pass, but not the conveyed material.

One will understand that hydraulic power can be provided by a towing vehicle, such as a tractor or the like or alternatively, hydraulic power can be provided on the tender and driving electrically from the towing vehicle, such as a truck.

Thus, a number of preferred embodiments have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention.

We claim:

1. A seed or grain tender comprising:
   a main hopper having a main hopper discharge;
   a support arm having first and second ends;
   said first end of said support arm being located below said main hopper and being rotatable about a first axis of rotation, and said first end of said support arm being rotatable about a second axis of rotation that is perpendicular to said first axis of rotation;
   a conveyor having a longitudinal axis and first and second ends, a conveyor hopper at said first end, a conveyor discharge at said second end, and an internal elevator for moving seed or grain from said conveyor hopper to said conveyor discharge;
   said second end of said support arm being coupled with said conveyor between said first and second ends of said conveyor, said conveyor being rotatable about a third axis of rotation at said second end of said support arm that is not parallel to said conveyor longitudinal axis, and said conveyor being rotatable in relation to said second end of said support arm about said third of axis of rotation between an unloading position wherein said conveyor hopper is disposed below said main hopper discharge to receive agricultural product from said main hopper and a loading position wherein said conveyor discharge is disposed above said main hopper to dispense agricultural product into said main hopper, and
   a hydraulic piston extending at an acute angle relative to a horizontal plane to connect with a portion of said support arm spaced from said second axis of rotation.

2. The seed or grain tender of claim 1, wherein said first axis of rotation extends through said main hopper discharge.

3. The seed or grain tender of claim 1, wherein said second axis of rotation extends through said first end of said support arm.

4. The seed or grain tender of claim 1, wherein said third axis of rotation extends through said conveyor.

5. The seed or grain tender of claim 1, wherein said third axis of rotation extends through said second end of said support arm.

6. The seed or grain tender of claim 1, wherein said third axis of rotation extends through said conveyor and said second end of said support arm.

7. The seed or grain tender of claim 1, wherein said third axis of rotation is oriented at an angle having a vertical component.

8. The seed or grain tender of claim 1, wherein said second end of said support arm is coupled with said conveyor at or near said approximate center of gravity of said conveyor.

9. The seed or grain tender of claim 1, further comprising a stand coupled with said first end of said conveyor and movable between a stowed position allowing said conveyor hopper to be positioned below said main hopper discharge when said conveyor is in said unloading position and an extended position supporting said conveyor hopper above the ground when said conveyor is in said loading position.

10. A seed or grain tender comprising:
    a main hopper having an upper portion with a main hopper intake opening and a lower portion with a main hopper discharge;
    a support arm having a first end proximate said lower portion of said main hopper and a second end;
    wherein said support arm is pivotable about a first axis of rotation proximate said first end of said support arm to cause said support arm to be movable between an operating position wherein said support arm extends outwardly relative to said main hopper and a storage position wherein said support arm is folded inwardly towards said main hopper in relation to said operating position, said support arm further being pivotable about a second axis of rotation proximate said first end of said support arm to cause an elevation of said second end of said support arm to be adjustable;
    a conveyor having a longitudinal axis and first and second ends, a conveyor hopper at said first end, a conveyor discharge at said second end, and an internal elevator for moving seed or grain from said conveyor hopper to said conveyor discharge; and
    said second end of said support arm being coupled with said conveyor between said first and second conveyor ends, said conveyor being rotatable about a third axis of rotation proximate said second end of said support arm that is not parallel to said conveyor longitudinal axis, and said conveyor being rotatable in relation to said second end of said support arm about said third of axis of rotation between an unloading position wherein said conveyor hopper is disposed below said main hopper discharge to receive agricultural product from said main hopper and a loading position wherein said conveyor discharge is disposed above said intake opening of said main hopper to dispense agricultural product into said main hopper.

11. The seed or grain tender of claim 10, wherein said first axis of rotation extends through said main hopper discharge.

12. The seed or grain tender of claim 10, wherein said second axis of rotation extends through said first end of said support arm.

13. The seed or grain tender of claim 10, wherein said third axis of rotation extends through said conveyor.

14. The seed or grain tender of claim 10, wherein said third axis of rotation extends through said second end of said support arm.

15. The seed or grain tender of claim 10, wherein said third axis of rotation extends through said conveyor and said second end of said support arm.

16. The seed or grain tender of claim 10, wherein said third axis of rotation is oriented at an angle having a vertical component.

17. The seed or grain tender of claim 16, wherein said first axis of rotation is vertical.

18. The seed or grain tender of claim 17, wherein said second axis of rotation is horizontal.

19. The seed or grain tender of claim 10, wherein said second end of said support arm is coupled with said conveyor at an approximate center of gravity of said conveyor.

20. The seed or grain tender of claim 10, further comprising a hydraulic piston extending at an acute angle relative to a horizontal plane to connect with a portion of said support arm spaced from said second axis of rotation.

21. The seed or grain tender of claim 10, further comprising a stand coupled with said first end of said conveyor and movable between a stowed position allowing said conveyor hopper to be positioned below said main hopper discharge when said conveyor is in said unloading position and an extended position supporting said conveyor hopper above the ground when said conveyor is in said loading position.

\* \* \* \* \*